(12) United States Patent
Drevon et al.

(10) Patent No.: US 11,553,380 B2
(45) Date of Patent: Jan. 10, 2023

(54) SUPPORT OF CS FALLBACK IN AN EVOLVED PACKET SYSTEM

(71) Applicant: Alcatel Lucent, Boulogne Billancourt (FR)

(72) Inventors: Nicolas Drevon, Nozay (FR); Laurent Thiebaut, Nozay (FR); Bruno Landais, Lannion (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/432,570

(22) PCT Filed: Oct. 3, 2013

(86) PCT No.: PCT/EP2013/070615
§ 371 (c)(1),
(2) Date: Mar. 31, 2015

(87) PCT Pub. No.: WO2014/053593
PCT Pub. Date: Apr. 10, 2014

(65) Prior Publication Data
US 2015/0296420 A1    Oct. 15, 2015

(30) Foreign Application Priority Data
Oct. 3, 2012 (EP) .................................... 12306206

(51) Int. Cl.
*H04W 36/00* (2009.01)
*H04W 48/18* (2009.01)

(52) U.S. Cl.
CPC ....... *H04W 36/0022* (2013.01); *H04W 48/18* (2013.01)

(58) Field of Classification Search
CPC .. H04W 36/00; H04W 36/0022; H04W 48/18
See application file for complete search history.

(56) References Cited

U.S. PATENT DOCUMENTS

| | | |
|---|---|---|
| 8,547,969 B2 | 10/2013 | Watfa et al. |
| 8,849,319 B2 | 9/2014 | Zhang et al. |

(Continued)

FOREIGN PATENT DOCUMENTS

| | | | | |
|---|---|---|---|---|
| EP | 2302844 A1 | * | 3/2011 | ............ H04W 28/06 |
| JP | 2011-23873 A | | 2/2011 | |

(Continued)

OTHER PUBLICATIONS

"3ra Generation Partnership Project; Technical Specification Group Services and System Aspects; Circuit Switched (CS) fallback in Evolved Packet System (EPS); Stage 2 (Release 11 )," 3GPP TS 23.272 V11.2.0, pp. 1-90, XP050649055, (Sep. 2012).*

(Continued)

*Primary Examiner* — Jinsong Hu
*Assistant Examiner* — Farideh Madani
(74) *Attorney, Agent, or Firm* — Fay Sharpe LLP (57) ABSTRACT

An embodiment of the present invention is a method for support of Circuit Switched (CS) fallback in an Evolved Packet System (EPS), said support including moving a User Equipment (UE) from an evolved Radio Access Network (RAN) to a legacy RAN for access to CS domain services, and moving back said UE from said legacy RAN to said evolved RAN at termination of said CS domain services, said support including moving back said UE to said evolved RAN in the Public Land Mobile Network (PLMN) that was serving said UE over said evolved RAN before moving said UE to said legacy RAN.

10 Claims, 5 Drawing Sheets

(56) References Cited

U.S. PATENT DOCUMENTS

| | | | |
|---|---|---|---|
| 9,252,936 B2* | 2/2016 | Olsson | H04W 36/0022 |
| 2004/0029587 A1* | 2/2004 | Hulkkonen | H04W 36/0066 |
| | | | 455/436 |
| 2010/0317375 A1* | 12/2010 | Burbidge | H04W 36/0022 |
| | | | 455/458 |
| 2011/0021216 A1* | 1/2011 | Pudney | H04W 4/12 |
| | | | 455/466 |
| 2011/0188468 A1 | 8/2011 | Vikberg et al. | |
| 2012/0231760 A1 | 9/2012 | Zhu et al. | |
| 2013/0017805 A1* | 1/2013 | Andre-Jonsson | |
| | | | H04W 36/0066 |
| | | | 455/411 |
| 2013/0210429 A1 | 8/2013 | Aoyagi et al. | |
| 2013/0260765 A1 | 10/2013 | Aoyagi et al. | |
| 2015/0087311 A1 | 3/2015 | Wu et al. | |

FOREIGN PATENT DOCUMENTS

| | | |
|---|---|---|
| JP | 2012-39577 A | 2/2012 |
| JP | 2012-169719 A | 9/2012 |
| JP | 2013-516805 | 5/2013 |
| JP | 2015-523007 | 8/2015 |
| KR | 10-2011-0118166 | 10/2011 |
| KR | 10-2011-0134937 | 12/2011 |
| WO | WO 2011/016173 | 2/2011 |
| WO | WO 2011/079647 | 7/2011 |
| WO | WO 2012/046830 | 4/2012 |
| WO | WO-2012045377 A1 * | 4/2012 ............ H04W 76/18 |
| WO | WO 2012/108820 A1 | 8/2012 |
| WO | WO 2013/181805 | 12/2013 |

OTHER PUBLICATIONS

Huawei, et al., "Including the last used LTE PLMN ID in the EPLMN list for CSFB return," 3GPP TSG-CT WG1, Meeting #84 C1-133615, Aug. 9, 2013, URL, http://www.3gpp.org/ftp/tsg_ct/WG1_mm-cc-sm_ex-CN1/TSGC1_84_Vienna/docs/C1-133615.zip.

"$3^{rd}$ Generation Partnership Project; Technical Specification Group Services and System Aspects; Circuit Switched (CS) fallback in Evolved Packet System (EPS); Stage 2 (Release 11)," 3GPP TS 23.272 V11.2.0, pp. 1-90, XP050649055, (Sep. 2012).

$3^{rd}$ Generation Partnership Project; Technical Specification Group Services and System Aspects; Network Sharing; Architecture and functional description (Release 11), 3GPP TS 23.251 V11.3.0, pp. 1-30, XP050649054, (Sep. 2012).

Huawei et al., "Network sharing impact on the CSFB," $3^{rd}$ Generation Partnership Project (3GPP), 3GPP TSG SA WG2 Meeting #92, S2-122769, pp. 1-21, XP050633296, Barcelona, Spain, Jul. 9-13, 2012.

International Search Report for PCT/EP2013/070615 dated Nov. 7, 2013.

* cited by examiner

FIG_1

FIG. 5

SUPPORT OF CS FALLBACK IN AN EVOLVED PACKET SYSTEM

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

In such systems, a mobile terminal (or User Equipment UE) has access via a Radio Access Network (RAN) to a Core Network (CN) providing mobile communication services.

Examples of systems, such as for example 3GPP systems, include: 2G systems such as GSM/GPRS, 3G systems such as UMTS, 4G-LTE (Long Term Evolution) systems such as EPS (Evolved Packet System).

Examples of communication services include: CS (Circuit-Switched) services such as in particular voice services provided via CS domain, and IP-based services such as IMS-based services provided via PS domain providing IP connectivity.

In legacy systems such as 2G/3G systems, the Core Network comprises a CS domain. In systems such as for example GSM/GPRS or UMTS, the CS domain is accessed either by a Radio Access Network (RAN) called GERAN, or by a Radio Access Network (RAN) called UTRAN. In systems such as for example GSM/GPRS or UMTS, CS domain includes entities such as MSC/VLR.

On the contrary, evolved systems such as 4G-LTE systems are packet-only systems, whose Core Network only comprises a PS domain. For example, in EPS the Core Network called Evolved Packet Core (EPC) is accessed by a Radio Access Network (RAN) called E-UTRAN. For example in EPS, the PS domain (EPC) includes entities such as, in the control plane, Mobility Management Entity (MME).

A functionality called CSFB (CS Fallback) in EPS has been introduced, enabling fallback from E-UTRAN access to UTRAN/GERAN CS domain access and reuse of voice and other CS-domain services by reuse of the CS domain, in case e.g. IMS voice services are not supported.

Figure 1:
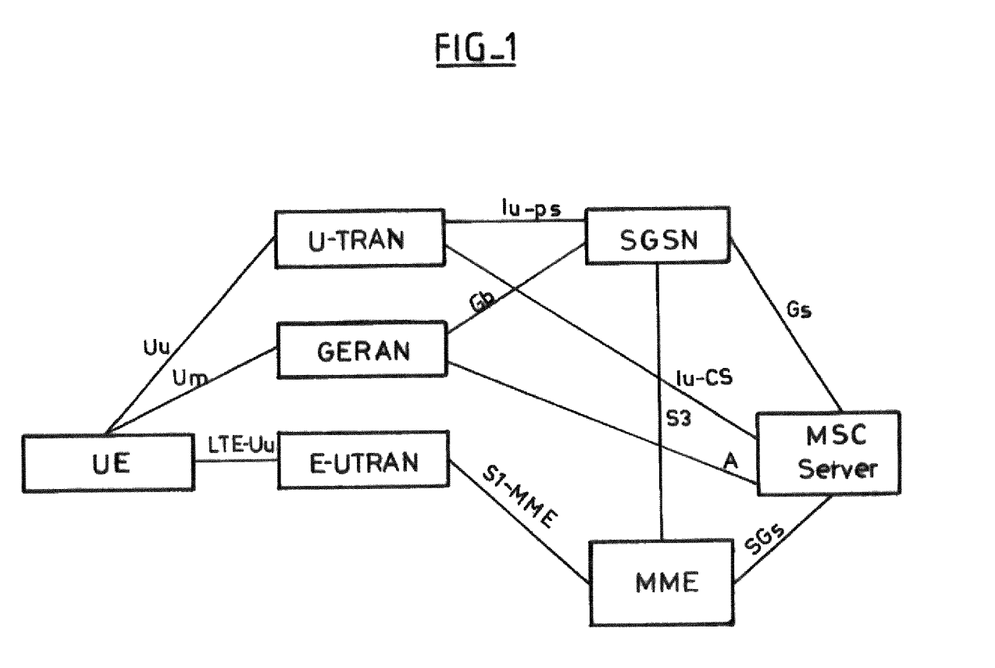
FIG. 1 is intended to recall a system architecture for CSFB (CS Fallback) in EPS.

CSFB (CS Fallback) in EPS is specified in particular in 3GPP TS 23.272. An architecture for CSFB in EPS is recalled in FIG. 1 taken from 3GPP TS 23.272. CSFB in EPS uses SGs interface between MSC/VLR in CS domain and MME in EPC. SGs interface is specified in particular in 3GPP TS 29.118.

According to 3GPP TS 23.272, once CS service ends in CS domain, existing mechanisms can be used to move the UE back to E-UTRAN and no specific CS fallback mechanisms are needed. However, as recognized by the inventors and as will described with more detail later, problems may arise when moving the UE back to E-UTRAN, which may impact end-user experience as well as overall system performance. There is a need for new mechanisms for solving such problems and/or avoiding such drawbacks. More generally there is a need to improve support of functionalities such as CSFB in EPS.

Embodiments of the present invention in particular address such needs.

These and other objects are achieved, in one aspect, by a method for the support of Circuit Switched CS fallback in an Evolved Packet System EPS, said support including moving an User Equipment UE from an evolved Radio Access Network RAN to a legacy RAN for access to CS domain services, and moving back said UE from said legacy RAN to said evolved RAN at the end of said CS domain services, said support including moving back said UE to said evolved RAN in a PLMN that was serving said UE over said evolved RAN before moving said UE to said legacy RAN.

These and other objects are achieved, in other aspects, by mobile communication system entities configured for carrying out such method, said entities including, in particular (though not exclusively):
User Equipment UE
Legacy RAN node such as Base Station Controller BSC or Radio Network Controller RNC
EPS network entity such as Mobility Management Entity MME
CS domain entity such as MSC/VLR.

Some embodiments of apparatus and/or methods in accordance with embodiments of the present invention are now described, by way of example only, and with reference to the accompanying drawings, in which.

Embodiments of the present invention will be more detailed in the following, by way of example for CSFB (CS Fallback) for EPS. However the present invention is not limited to such example.

When for example VoIP is not supported/possible (e.g. based on the subscription or network deployment) over the LTE (i.e. E-UTRAN) radio and an UE camping over E-UTRAN needs services that can only be provided over the CS domain (e.g. the UE initiates or receives a voice call), a feature called CSFB (Circuit Switch Fall Back) is invoked that pushes the UE from E-UTRAN towards a legacy radio system (2G/3G) where the UE can access the CS domain (to a MSC/VLR). This feature is defined in 3GPP 23.272.

As part of CSFB mechanisms
The MME serving the UE over E-UTRAN has an SGs interface with a MSC/VLR for this UE to be registered over CS domain even though the UE is camping over a radio (E-UTRAN) where CS domain is not supported When CSFB (Circuit Switch Fall Back) is invoked, the UE is pushed from E-UTRAN towards a legacy radio system (2G/3G) where the UE can access the CS domain (to a MSC/VLR) but it may happen that the legacy (2G/3G) cell where the UE camps is served by another MSC/VLR than the one that supports SGs for this UE We call "The MSC/VLR that anchors and controls the CSFB services (call)" the MSC/VLR that controls the CS domain services after the UE has been pushed to legacy coverage by a CSFB procedure. This MSC/VLR may be different from the MSC/VLR that terminates the SGs link for an UE.

Once the CS domain service (e.g. voice call) is over, the UE is pushed back towards E-UTRAN by the RAN (GERAN, UTRAN) that serves the UE at that point of time.

This "push back" may take the form of a RR/RRC redirection at the release of the CS call as detailed in TS 23.272, e.g.

GERAN case: If the BSC receives an indication from the MSC that the CS service (Call, CISS or LCS) was established as a result of CS fallback, the BSC may e.g. select to use Individual Priorities Information Element in the RR CHANNEL RELEASE message to send the UE back to E-UTRAN at release of the CS service.

UTRAN case: If the RNC receives an indication from the MSC that the CS service (Call, CISS or LCS) was established as a result of CS fallback the RNC may e.g. select to use RRC Connection Release with Redirection Info Information Element to send the UE back to E-UTRAN at release of the CS service, or to use Dedicated priority information Information Element in the RRC UTRAN Mobility Information message prior to releasing the RRC connection.

Issues arising when moving the UE back to E-UTRAN may be explained as follows, to simplify based on an example. The term PLMN used in the following stands for Public Land Mobile Network as known in particular from 3GPP Technical Specifications.

As an example, let's assume the following:
UE has IMSI from PLMN-H
2G or 3G network: PLMN-X
4G-LTE networks: PLMN-A and PLMN-B
Both 4G-LTE PLMN-A operator and 4G-LTE PLMN-B operator have roaming agreements with PLMN-H operator, i.e. when the UE is roaming in an area covered by 4G-LTE PLMN-A and 4G-LTE PLMN-B, it may select either A or B with the same priority.
For roamers in PLMN-A or PLMN-B, 2G/3G PLMN-X is an equivalent PLMN.

If an UE of PLMN-X is roaming in 4G-LTE PLMN-A (resp. PLMN-B) then a CSFB procedure for a CS service triggers the UE to move to 2G/3G PLMN-X; at the end of the CS service, 2G/3G PLMN-X network needs to send the UE back to LTE, and it is better that the UE is sent back to 4G-LTE PLMN-A (resp. PLMN-B), i.e. the 4G-LTE PLMN it comes from.

But for a UE roaming in 2G/3G PLMN-X, both 4G-LTE PLMN-A and 4G-LTE PLMN-B may be equivalent, which results in 2G/3G PLMN-X network having no preference between these two 4G-LTE PLMNs. Therefore, with existing mechanisms, 2G/3G PLMN-X may select a 4G-LTE PLMN that is different from the 4G-LTE PLMN the UE is coming from.

The issues to solve are as follows:
The mobility from CS-VPLMN to an 4G-LTE PLMN different from the original 4G-LTE PLMN would induce an inter operator PS (Packet Switched) mobility to that (new) 4G-LTE PLMN (either from a SGSN belonging to 3G PLMN-X or from the MME of the original 4G-LTE PLMN when the CSFB procedure has sent the UE to 2G coverage of the 2G/3G PLMN-X as usually 2G-SGSN nodes do not support PS handover and the UE data session is only suspended as long as the UE remains in 2G coverage with an active CS call).
In the latter case (UE data session mobility from the MME of the initial 4G-LTE PLMN (PLMN-A) to a MME of another 4G-LTE PLMN (PLMN-B), it is likely that such inter-PLMN mobility is not possible as inter-PLMN mobility is rarely deployed, especially as 4G-LTE PLMN-A and 4G-LTE PLMN-B are generally competitors. This would mean that when it comes back to LTE, the UE would be forced to re-Attach on the MME of the new 4G-LTE PLMN with as a consequence the loss of the IP connectivity (loss of IP address) acquired over the original 4G-LTE PLMN. This may be especially sensitive for on-going IMS (data) sessions, as they would be broken with furthermore the need for the UE to restart the IMS registration procedure.

This would induce a lot of useless signaling over the radio as well as over the network (PS core network and IMS) and result in bad end user experience.

Background scanning of higher priority PLMNs would lead the UE to return it to highest priority PLMN (e.g. 4G-LTE PLMN-A) if the UE for any reason registered to a lower priority PLMN (e.g. 4G-LTE PLMN-B) in E-UTRAN after the CS call. The background scanning interval has a default value of 60 minutes, unless the HPLMN operator has configured a different value in the range of 6 minutes to 8 hours. So if the UE selects another PLMN for CSFB, then it can take some time before it finds its way back. As a result:

the user may use a lower priority PLMN in E-UTRAN for some time, that could possibly have charging impacts for the user (e.g. if the user is not preferentially redirected to a PLMN pertaining to the Operator Group);

the background scanning of higher priority PLMNs would end up again with a new Inter-PLMN Packet mobility, resulting in further network signaling and user experience impacts.

Repeated over time for all in-bound roamers, after every CSFB call, makes the problem critical to address.

There is currently no solution to such problem, as the BSC/RNC cannot know with the current standards the PLMN selected by the UE before the CSFB call (the roamer may have been on any PLMN operator network in LTE).

Embodiments of the present invention rely on providing the Identity of the PLMN that was serving the UE over E-UTRAN (before the CSFB procedure) to the RAN node (BSS/RNC) serving the UE when legacy (2G/3G) radio resources are released for the UE (at the end of the set of CS domain services that have triggered a CSFB procedure). The RAN serving the UE when the CS service is terminated leverages this information to push back the UE towards E-UTRAN in the PLMN where the UE was camping before the CSFB procedure.

This may require 3 steps:
1. The MSC/VLR that anchors and controls the CS services (call) of an UE is notified with the Identity of the PLMN that was serving the UE over E-UTRAN
   The way to carry out this step is further detailed.
2. At the end of CS services delivered to an UE per CSFB procedures (actually when legacy (2G/3G) radio resources are released for the UE), the Identity of the PLMN that was serving the UE over E-UTRAN is transferred by the MSC/VLR that anchors and controls the CS service (call) to the RAN node (BSS/RNS) serving the UE at that time.
3. The RAN serving the UE when the CS service is terminated leverages this information to push back the UE towards E-UTRAN in the PLMN where the UE was camping before the CSFB procedure.

As a possible alternative to 1. and 2., the RAN node (BSS/RNS) serving the UE after the CSFB procedure obtains the Identity of the PLMN that was serving the UE over E-UTRAN directly from the UE when the latter accesses the legacy (2G/3G) cell during the CSFB procedure, e.g. via Access Stratum signalling during the RRC connection establishment procedure.

The notification of the MSC/VLR that anchors and controls the CS services of the UE with the Identity of the PLMN that was serving the UE over E-UTRAN is performed as follows:

The VLR that supports the SGs link associated with an UE receives from the MME (over SGs) the identification of the PLMN serving the UE over E-UTRAN.

During a CSFB procedure, this information is passed to the MSC/VLR that anchors and controls a CSFB service (e.g. call) for this UE.

This transfer of information is generally local, as generally, the MSC/VLR that anchors and controls a CSFB service (e.g. call) for an UE also hosts the VLR that supports the SGs link associated with this UE Nevertheless, in some cases, these nodes are different, e.g. when for a MT (Mobile Terminated) CSFB procedure, the 2G/3G legacy cell where the UE answers to the CSFB paging is served by another MSC/VLR than the one that supports the SGs link associated with this UE;

For a MO (Mobile Originated) CSFB procedure, the legacy cell where the UE initiates a the CSFB call is served by another MSC/VLR than the one that supports the SGs link associated with this UE.

In these cases, the notification of the MSC/VLR that anchors and controls the CS services of the UE with the Identity of the 4G-LTE PLMN that was serving the UE over E-UTRAN can be performed via two different ways:

Alternative A: the MSC/VLR that supports the SGs link associated with the UE provides this information (identification of the PLMN serving the UE over E-UTRAN) to the MSC/VLR that anchors and controls the CSFB service for this UE via inter MSC signalling: the PLMN-Id of the 4G-LTE PLMN serving the UE before the CSFB procedure is sent from the source MSC/VLR that supports the SGs link to the target MSC/VLR that anchors and controls the CS services of the UE during the Location Area Update procedure triggered by the UE for MO calls or during the MTRF procedure for MT calls.

Alternative B: the UE sends the Identity of the 4G-LTE PLMN that was serving the UE over E-UTRAN to the MSC/VLR that anchors and controls a CSFB service (e.g. call) via NAS (Non-Access Stratum) signalling.

The steps described above may be implemented as follows (where terms such as PLMN-ID or PLMN-Id stand for PLMN Identifier as known in particular from 3GPP Technical Specifications):

1. The MSC/VLR that anchors and controls the CSFB services (e.g. call) of the UE is notified with the PLMN-Id of the 4G-LTE PLMN serving the UE according to following procedure:

a. The MSC/VLR that terminates the SGs link for an UE receives the 4G-LTE PLMN ID over SGs. This uses following Information Elements:

For MT (Mobile terminating) services: like described for Mobile Originating services below, or as follows. The 4G-LTE PLMN-ID already present in the TAI Information Element or/and the E-CGI Information Element of the SGs Service Request message, received by the MSC/VLR from the MME over SGs during the CSFB procedure (see 3GPP 23.272 clause 7 and 3GPP 29.118 clause 8.17). This corresponds to existing procedures.

For MO (Mobile originating) services: The 4G-LTE PLMN-ID PLMN-ID already present in the TAI Information Element or/and the E-CGI Information Element of the SGs LOCATION-UPDATE-REQUEST message, received by the MSC/VLR from the MME over SGs. It is needed to add as part of embodiments of the invention that the MME should re-issue a LOCATION-UPDATE-REQUEST over SGs when the PLMN-Id of the E-UTRAN PLMN serving the UE changes.

b. When the MSC/VLR that terminates the SGs link is the MSC/VLR that anchors and controls the CSFB services of the UE the latter is thus notified locally with the PLMN-Id of the E-UTRAN PLMN serving the UE before the CSFB procedure:

c. When the MSC/VLR that anchors and controls a CSFB service (e.g. call) is different from the VLR that supports the SGs link associated with this UE, the MSC/VLR that anchors and controls CSFB services for the UE is notified as follows:

For MT (Mobile terminating) services:

A new Information Element containing the 4G-LTE PLMN-ID is added in the MAP Provide Roaming Number Request (MTRF procedure described in 3GPP TS 23.018) from the MSC/VLR that supports the SGs interface procedure to the MSC/VLR that anchors and controls the CS services) This new Information Element is defined as part of embodiments of this invention for alternative A.

A new Information Element containing the 4G-LTE PLMN-ID and received by the MSC/VLR from the UE over NAS signaling (3GPP 24.008). This new Information Element is defined as part of embodiments of this invention for alternative B, and sent together with the CSFB indication in Location Updating Request message (see 3GPP 24.008 clause 9.2.15 and CSFB indication in 'Additional Update Parameters" in clause 10.5.3.14).

Note: this Location Update Request actually serves as a paging response when the UE needs first to initiate a LAU procedure due to a change of LA.

For MO (Mobile Originating) services:

For alternative A: A new Information Element containing the 4G-LTE PLMN-ID in the MAP_SEND_IDENTIFICATION Response from the MSC/VLR that supports the SGs interface procedure to the MSC/VLR that anchors and controls the CS services. This new Information Element is defined as part of embodiments of this invention for alternative A.

For alternative B: A new Information Element containing the 4G-LTE PLMN-ID and received by the MSC/VLR from the UE over NAS (3GPP 24.008) signaling. This new Information Element is defined as part of embodiments of this invention and is sent together with the CSFB indication in CM Service Request message (see 3GPP 24.008 clause 9.2.9, and CSFB indication in 'Additional Update Parameters in clause 10.5.3.14) and in Location Updating Request message (see 3GPP 24.008 clause 9.2.15 and CSFB indication in 'Additional Update Parameters" in clause 10.5.3.14).

The MSC/VLR that anchors and controls a CSFB service (e.g. call) stores the received 4G-LTE PLMN-ID information as long as the signaling connection is established with the UE.

The MSC/VLR that anchors and controls a CSFB service transfers the 4G-LTE PLMN-ID to the target MSC during subsequent inter-MSC handover (addition being part of embodiments of this invention) to enable the target MSC node to provide the 4G-LTE PLMN-ID to the RAN node at the release of the CS call.

2. This MSC/VLR that anchors and controls a CSFB service (e.g. call) provides the stored 4G-LTE PLMN-ID information within a new Information Element (defined as part of embodiments of this invention) in the BSSMAP Clear Command (see 3gpp 48.008 clause 3.2.1.21)/RANAP Iu Release Command (see 3gpp 25.413 clause 9.1.7) sent to the BSC/RNC serving the UE when the CS service is terminated for the UE, together with the existing CSFB call indication ("CSFB indication" or "End of CSFB" IE in 3gpp 48.008 and 25.413 respectively).

3. The BSC/RNC uses the 4G-LTE PLMN-ID information to provide the UE with instructions redirecting the UE back towards that (source) 4G-LTE PLMN. These instructions may correspond to providing:

the target LTE frequency where the UE should try to camp, e.g. via Individual Priorities Information Element in the RR CHANNEL RELEASE message in case of GERAN, and via Redirection Info Information Element in the RRC Connection Release message or via Dedicated priority information Information Element in the RRC UTRAN Mobility Information message prior to releasing the RRC connection in case of UTRAN;

possibly augmented with a new Information Element (defined as part of embodiments of this invention) in the same message providing the identity of the corresponding (source) 4G-LTE PLMN.

Note that the above existing RR CHANNEL RELEASE and RRC Connection Release messages trigger a cell re-selection, therefore the target E-UTRAN cells can only be in the registered PLMN or in an Equivalent PLMN. The list of equivalent PLMN is either derived by the BSC/RNC node from the SNA Access Information received in existing BSSMAP/RANAP messages, or configured locally.

4. As a possible alternative to 1. and 2., the RAN node (BSS/RNS) serving the UE after the CSFB procedure obtains the Identity of the PLMN that was serving the UE over E-UTRAN directly from the UE when the latter accesses the legacy (2G/3G) cell during the CSFB procedure, e.g. the UE provides the 4G-LTE PLMN-ID information within a new Information Element (defined as part of embodiments of this invention) during the RRC connection establishment procedure. The 4G-LTE PLMN-ID is also transferred between RAN nodes (e.g. via RAN transparent containers) during handovers (addition being part of embodiments of this invention) to enable the target RAN node to redirect the UE to the 4G-LTE PLMN at the release of the CS call.

FIGS. 2 to 5 illustrate some of the above-described embodiments.

These figures illustrate messages or information flows during a CSFB procedure. The different mobile communication system entities illustrated in these figures include: UE, LTE RAN, MME, MSC terminating SGs interface (noted (SGs) MSC), MSC anchoring and controlling the CS domain services (noted Anchor MSC), and Legacy RAN. These figures also illustrate LTE-PLMN comprising LTE RAN and MME, and Legacy PLMN (noted CS-PLMN) comprising (SGs) MSC, Anchor MSC and Legacy RAN.

Figure 2:
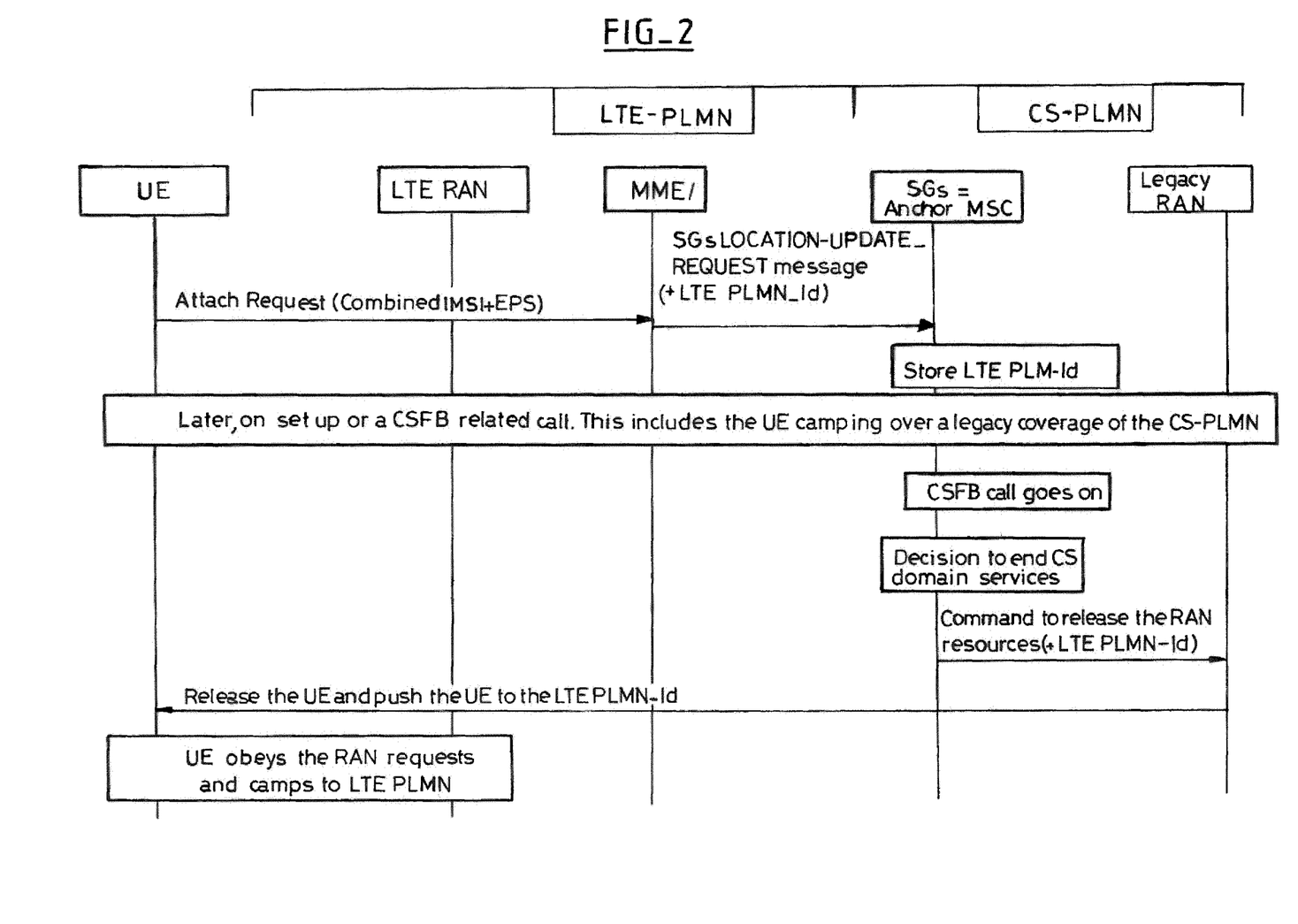
FIG. 2 is intended to illustrate, in a simplified way, an example of support of CS Fallback in EPS, according to embodiments of the present invention.

FIG. 2 illustrates embodiments for transfer of LTE PLMN-Id in case the Anchor MSC is the (SGs) MSC.

Following steps are illustrated in FIG. 2:

UE sends to MME an Attach Request message (Combined IMSI-EPS Attach)

MME sends to (SGs) MSC an SGs-Location-Update-Request message, this message containing LTE PLMN-Id Anchor MSC stores LTE PLMN-Id Later on, set-up of a CSFB related call, including the UE camping over a legacy coverage of the CS-PLMN CSFB call goes on Decision to end CS domain services Anchor MSC sends to Legacy RAN a Command to release the RAN resources, this message including LTE PLMN-Id Legacy RAN sends to UE a commend to release resources and push the UE to the LTE PLMN UE obeys the legacy RAN request and camps to LTE PLMN.

Figure 3:
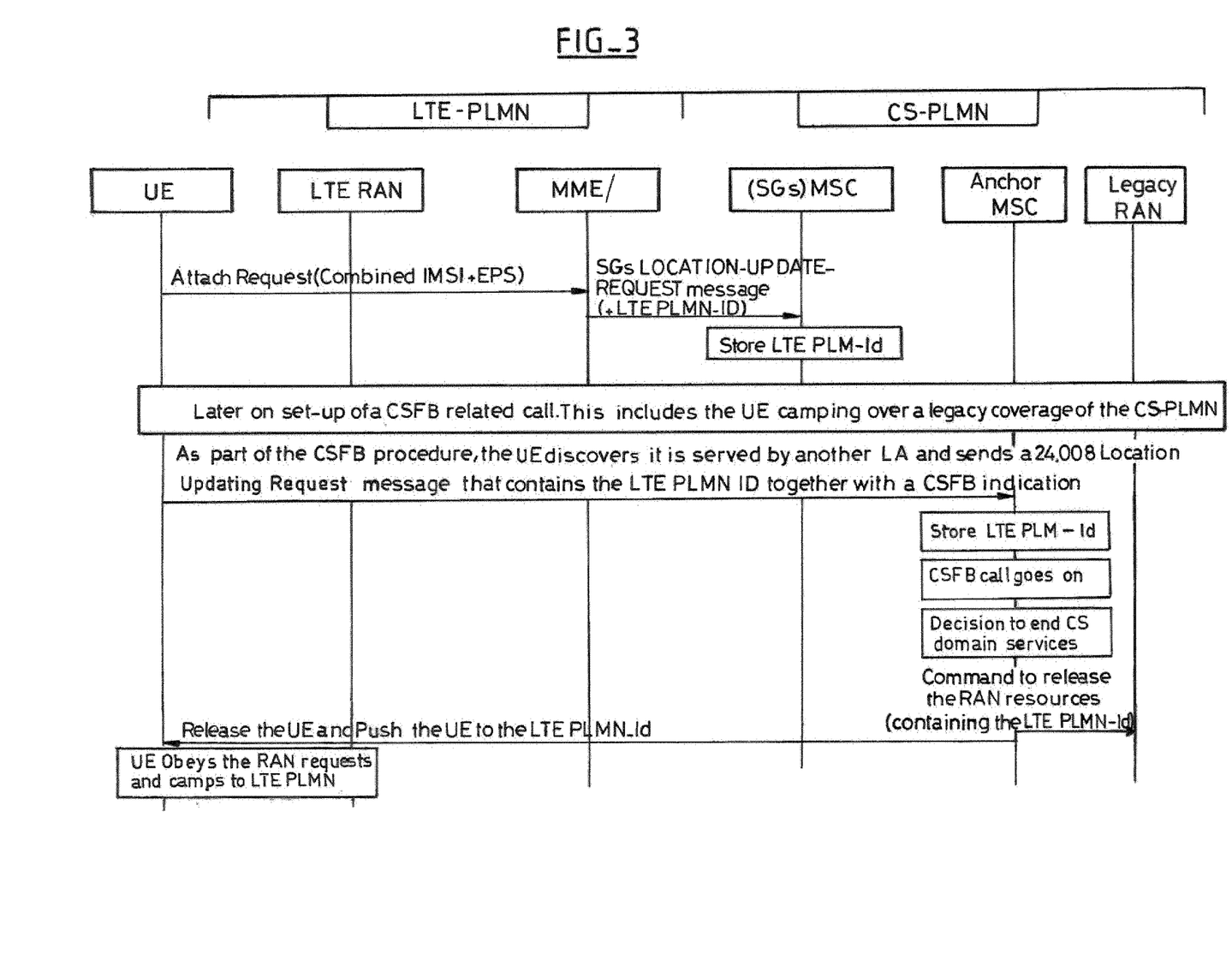
FIG. 3 is intended to illustrate, in a simplified way, another example of support of CS Fallback in EPS, according to embodiments of the present invention.

FIG. 3 illustrates embodiments for transfer of LTE PLMN-Id in case the Anchor MSC is different of the (SGs) MSC. In FIG. 3, the PLMN-Id is provided by the UE.

Following steps are illustrated in FIG. 3:

UE sends to MME an Attach Request message (Combined IMSI-EPS Attach)

MME sends to (SGs) MSC an SGs-Location-Update-Request message, this message containing LTE PLMN-Id (SGs) MSC stores LTE PLMN-Id Later on, set-up of a CSFB related call, including the UE camping over a legacy coverage of the CS-PLMN As part of the CSFB procedure, the UE is sent to another (Anchor) MSC and the UE discovers it is served by another Location Area (LA) and sends to Anchor MSC a Location Updating Request according to 3GPP TS 24.008, this message containing the LTE PLMN-Id together with a CSFB indication Anchor MSC stores LTE PLMN-Id CSFB call goes on Decision to end CS domain services Anchor MSC sends to Legacy RAN a Command to release the RAN resources, this message containing LTE PLMN-Id Legacy RAN sends to UE a command to release resources and push the UE to the LTE PLMN UE obeys the legacy RAN request and camps to LTE PLMN.

Figure 4:
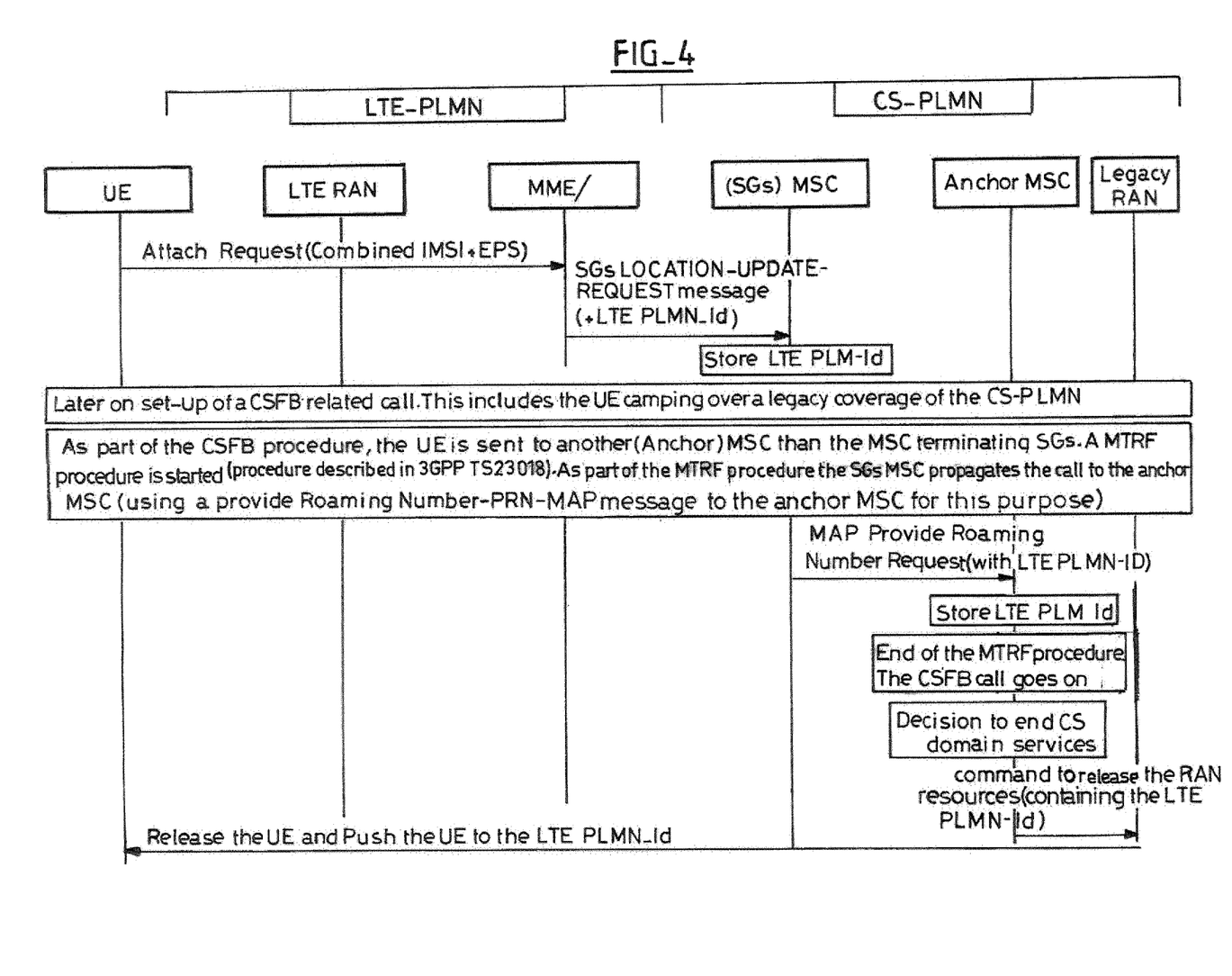
FIG. 4 is intended to illustrate, in a simplified way, another example of support of CS Fallback in EPS, according to embodiments of the present invention.

FIG. 4 illustrates embodiments for transfer of LTE PLMN-Id in case the Anchor MSC is different of the (SGs) MSC. In FIG. 4, the PLMN-Id is provided by the (SGs) MSC as part of the MTRF procedure (Mobile Terminating call).

Following steps are illustrated in FIG. 4:
UE sends to MME an Attach Request message (Combined IMSI-EPS Attach)
MME sends to (SGs) MSC an SGs-Location-Update-Request message, this message containing LTE PLMN-Id
(SGs) MSC stores LTE PLMN-Id
Later on, set-up of a CSFB related call, including the UE camping over a legacy coverage of the CS-PLMN
As part of the CSFB procedure, the UE is sent to another (Anchor) MSC than the MSC terminating SGs. A MTRF procedure is started (procedures described in 3GPP TS 23.018). As part of the MTRF procedure, the SGS MSC propagates the call to the Anchor MSC (using a Provide Roaming Number-PRN-MAP message to the Anchor MSC for this purpose)
(SGs) MSC sends to Anchor MSC a message MAP Provide Number Request, this message containing LTE PLMN-Id
Anchor MSC stores LTE PLMN-Id
End of the MTRF procedure. The CSFB call goes on
Decision to end CS domain services
Anchor MSC sends to Legacy RAN a Command to release the RAN resources, this message including LTE PLMN-Id
Legacy RAN sends to UE a command to release resources and push the UE to the LTE PLMN
UE obeys the legacy RAN request and camps to LTE PLMN.

Figure 5:
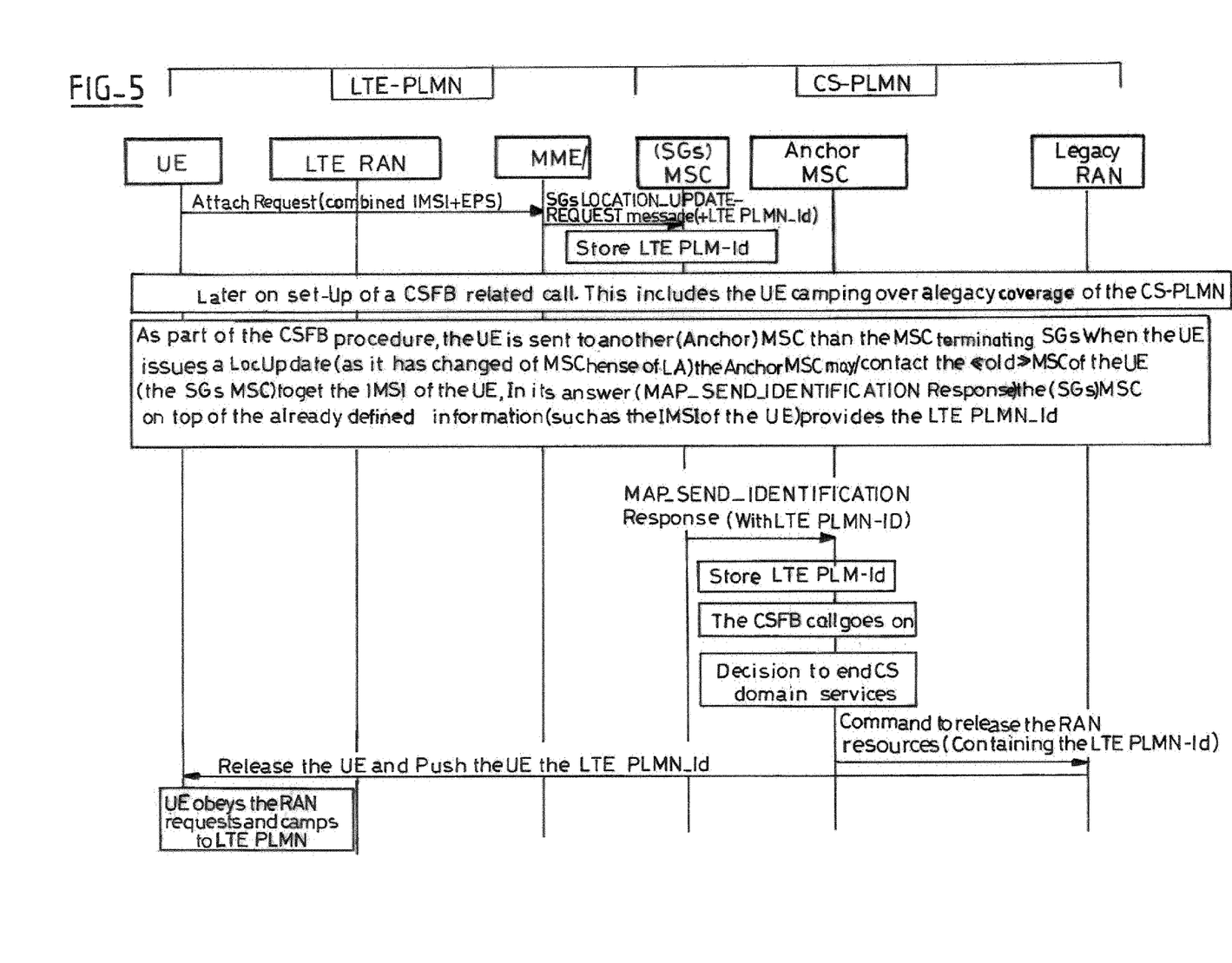
FIG. 5 is intended to illustrate, in a simplified way, another example of support of CS Fallback in EPS, according to embodiments of the present invention.

FIG. 5 illustrates embodiments for transfer of LTE PLMN-Id in case the Anchor MSC is different of the (SGs) MSC. In FIG. 5, the PLMN-Id is provided by the (SGs) MSC as part of the MAP-Send-Identification Response procedure.

Following steps are illustrated in FIG. 5:
UE sends to MME an Attach Request message (Combined IMSI-EPS Attach)
MME sends to (SGs) MSC an SGs-Location-Update-Request message, this message containing LTE PLMN-Id
(SGs) MSC stores LTE PLMN-Id
Later on, set-up of a CSFB related call, including the UE camping over a legacy coverage of the CS-PLMN
As part of the CSFB procedure, the UE is sent to another (Anchor) MSC.
When the UE issues a Location Update (as it has changed of MSC hence of Location Area LA), the Anchor MSC may contact the "old" MSC of the UE (the (SGs) MSC) to get the IMSI of the UE. In its answer (MAP-Send-Identification-Response) the (SGs) MSC on top of the already defined information (such as the IMSI of the UE) provides the LTE PLMN-Id
(SGs) MSC sends to Anchor MSC a message MAP-Send-Identification-Response, this message containing LTE PLMN-Id
Anchor MSC stores LTE PLMN-Id
CSFB call goes on
Decision to end CS domain services
Anchor MSC sends to Legacy RAN a Command to release the RAN resources, this message including LTE PLMN-Id
Legacy RAN sends to UE a command to release resources and push the UE to the LTE PLMN
UE obeys the legacy RAN request and camps to LTE PLMN.

Embodiments of the invention provide a number of benefits, including avoiding the loss of IP connectivity for the end user, and preventing important signaling overhead in the RAN, PS Core Network and IMS, and bad end user perception, by preferentially redirecting the UE after the release of the CS call to the PLMN where the UE was registered before the CSFB call.

Embodiments of the invention may be applicable to inbound roamers.

In one aspect, there is provided a method for the support of Circuit Switched CS fallback in an Evolved Packet System EPS.

Various embodiments may be provided, including following embodiments which may be taken alone or in combination, according to various combinations.

In an embodiment, said support including moving an User Equipment UE from an evolved Radio Access Network RAN to a legacy RAN for access to CS domain services, and moving back said UE from said legacy RAN to said evolved RAN at the end of said CS domain services, said support includes moving back said UE to said evolved RAN in a PLMN that was serving said UE over said evolved RAN before moving said UE to said legacy RAN.

In an embodiment, said method comprises:
 a legacy RAN node such as Base Station Controller BSC or Radio Network Controller RNC serving said UE at the end of said CS domain services obtaining information identifying said PLMN.

In an embodiment, said method comprises:
 a legacy RAN node such as Base Station Controller BSC or Radio Network Controller RNC serving said UE at the end of said CS domain services using information identifying said PLMN for moving said UE back to said evolved RAN.

In an embodiment, said method comprises:
 an EPS network entity interworking with a CS domain entity for said support of CS fallback, such as Mobility Management Entity MME interworking with MSC/VLR via SGs interface, providing information identifying said PLMN to said CS domain entity such as MSC/VLR.

In an embodiment, said method comprises:
 a CS domain entity interworking with an EPS network entity for said support of CS fallback, such as MSC/VLR interworking with Mobility Management Entity MME via SGs interface, providing information identifying said PLMN to a CS domain entity such as MSC/VLR anchoring and controlling said CS domain services.

In an embodiment, said method comprises:
 a CS domain entity interworking with an EPS network entity for said support of CS fallback, such as MSC/VLR interworking with Mobility Management Entity MME via SGs interface, passing locally information identifying said PLMN to a CS domain entity such as MSC/VLR anchoring and controlling said CS domain services.

In an embodiment, said method comprises:
 a CS domain entity such as MSC/VLR anchoring and controlling said CS domain services storing information identifying said PLMN.

In an embodiment, said method comprises:
 a CS domain entity such as MSC/VLR anchoring and controlling said CS domain services sending information identifying said PLMN to a legacy RAN node such as Base Station Controller BSC or Radio Network Controller RNC serving said UE at the end of said CS domain services, in a message such as a request for releasing resources such as BSSMAP Clear Command sent to Base Station Controller or RANAP Iu Release Command sent to Radio Network Controller RNC.

In an embodiment, said method comprises:

a CS domain entity such as MSC/VLR anchoring and controlling said CS domain services transferring information identifying said PLMN to a target CS domain entity such as MSC/VLR serving the legacy target RAN node supporting the UE, during subsequent inter-CS domain entity handover.

In an embodiment, said method comprises:

said UE sending to a CS domain entity such as MSC/VLR anchoring and controlling said CS domain services, in an NAS signalling message sent by said UE before set-up of said CS domain services, such as Location Area Update in case of Mobile Originating MO services or Mobile Terminating MT services, or CM Service Request in case of Mobile Originating MO services, including information identifying said PLMN.

In an embodiment, said method comprises:

a CS domain entity interworking with an EPS network entity for said support of CS fallback, such as MSC/VLR interworking with Mobility Management MME via SGs interface, providing information identifying said PLMN to a CS domain entity such as MSC/VLR anchoring and controlling said CS domain services, via inter-CS domain entities signalling, such as in MAP Send Identification Response sent in case of inter MSC mobility or in MAP Provide Roaming Number Request sent during Mobile Terminating Roaming Forwarding MTRF procedure in case of Mobile Terminating MT services.

In an embodiment, said method comprises:

an EPS network entity interworking with a CS domain entity for said support of CS fallback, such as Mobility Management Entity MME interworking with MSC/VLR via SGs interface, issuing a Location Update Request towards said CS domain entity such as MSC/VLR, when said PLMN serving said UE over said evolved RAN changes.

In an embodiment, said method comprises:

said UE sending information identifying said PLMN to a legacy RAN node such as Base Station Controller BSC or Radio Network Controller RNC serving said UE during CS domain services involving a CSFB procedure, in an AS signalling message sent by said UE before set-up of said CS domain services, such as during RRC connection establishment procedure.

In an embodiment, said method comprises:

a legacy RAN node such as Base Station Controller BSC or Radio Network Controller RNC serving said UE at the end of said CS domain services using information identifying said PLMN to provide said UE with instructions redirecting said UE back to said PLMN, in a message such as a request for releasing radio resources such as RR Channel Release message sent by Base Station controller or RRC Connection Release message sent by Radio Network Controller.

In an embodiment, said method comprises:

a legacy RAN node such as Base Station Controller BSC or Radio Network Controller RNC serving said UE at the end of said CS domain services providing said UE with a target frequency where the UE should try to camp in said PLMN, possibly augmented with information providing the identity of said PLMN, via an Information Element such as Individual Priorities in a RR Channel Release message sent by Base Station controller, or Redirection Info in a RRC Connection Release message sent by Radio Network Controller, or Dedicated Priority Information in a RRC UTRAN Mobility Information message sent by Radio Network Controller prior to releasing a RRC connection.

In other aspects, there are provided mobile communication system entities configured for carrying out such method, said entities including, in particular (though not exclusively):

User Equipment UE

Legacy RAN node such as Base Station Controller BSC or Radio Network Controller RNC EPS network entity such as Mobility Management Entity MME CS domain entity such as MSC/VLR.

In one aspect, there is provided a legacy RAN node such as Base Station Controller BSC or Radio Network Controller RNC, for the support of Circuit Switched CS fallback in Evolved Packet System EPS, said support including moving an User Equipment UE from an evolved RAN to a legacy RAN for access to CS domain services, and moving back said UE from said legacy RAN to said evolved RAN at the end of said CS domain services.

In an embodiment, said legacy RAN node is configured to support said moving back of said UE to said evolved RAN at the end of said CS domain services in a PLMN that was serving said UE over said evolved RAN before moving said UE to said legacy RAN.

In an embodiment, said legacy RAN node is configured to:

receive information identifying said PLMN from a CS domain entity such as MSC/VLR anchoring and controlling said CS domain services.

In an embodiment, said legacy RAN node is configured to:

use information identifying said PLMN for said moving back of said UE to said evolved RAN.

In another aspect, there is provided an EPS network entity such as Mobility Management Entity MME, for the support of CS fallback in Evolved Packet System EPS, said support including moving an User Equipment UE from an evolved Radio Access Network RAN to a legacy RAN for access to CS domain services, and moving back said UE from said legacy RAN to said evolved RAN at the end of said CS domain services, said EPS network entity interworking with a CS domain entity such as MSC/VLR via SGs interface.

In an embodiment, said EPS network entity is configured to support said moving back of said UE to said evolved RAN in a PLMN that was serving said UE over said evolved RAN before moving said UE to said legacy RAN.

In an embodiment, said EPS network entity is configured to:

provide information identifying said PLMN to said CS domain entity.

In an embodiment, said EPS network entity is configured to:

issue a Location Update Request towards said CS domain entity such as MSC/VLR, when said PLMN serving said UE over said evolved RAN changes.

In another aspect, there is provided a Circuit Switched CS domain entity such as MSC/VLR, for the support of CS fallback in an Evolved Packet System EPS, said support including moving an User Equipment UE from an evolved Radio Access Network RAN to a legacy RAN for access to CS domain services, and moving back said UE from said legacy RAN to said evolved RAN at the end of said CS domain services, said CS domain entity interworking with an EPS network entity such as Mobility Management Entity MME via SGs interface.

In an embodiment, said CS domain entity is configured to support said moving back of said UE to said evolved RAN in a PLMN that was serving said UE over said evolved RAN before moving said UE to said legacy RAN.

In an embodiment, said CS domain entity is configured to:
provide information identifying said PLMN to a CS domain entity such as MSC/VLR anchoring and controlling said CS domain services, via inter-CS domain entities signalling, such as in MAP Send Identification Response sent during a Location Area Update procedure for Mobile Originating MO calls.

In an embodiment, said CS domain entity is configured to:
provide information identifying said PLMN to a CS domain entity such as MSC/VLR anchoring and controlling said CS domain services, via inter-CS domain entities signalling, such as in MAP Provide Roaming Number Request sent during Mobile Terminating Roaming Forwarding MTRF procedure in case of Mobile Terminating MT calls.

IN another aspect, there is provided a Circuit Switched CS domain entity such as MSC/VLR, for the support of CS fallback in an Evolved Packet System EPS, said support including moving an User Equipment UE from an evolved Radio Access Network RAN to a legacy RAN for access to CS domain services, and moving back said UE from said legacy RAN to said evolved RAN at the end of said CS domain services, said CS domain entity anchoring and controlling said CS domain services.

In an embodiment, said CS domain entity is configured to support said moving back of said UE to said evolved RAN in a PLMN that was serving said UE over said evolved RAN before moving said UE to said legacy RAN.

In an embodiment, said CS domain entity is configured to:
send information identifying said PLMN to a legacy RAN node such as Base Station Controller BSC or Radio Network Controller RNC serving said UE at the end of said CS domain services, in a message such as a request for releasing resources.

In another aspect, there is provided an User Equipment UE for the support of Circuit Switched CS fallback in an Evolved Packet System EPS, said support including moving said UE from an evolved RAN to a legacy RAN for access to CS domain services, and moving back said UE from said legacy RAN to said evolved RAN at the end of said CS domain services.

In an embodiment, said UE is configured to support said moving back of said UE to said evolved RAN in a PLMN that was serving said UE over said evolved RAN before moving said UE to said legacy RAN.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A mobility management entity for supporting interworking with a mobile switching center/visitor location register via an SGs interface, said mobility management entity comprising:
at least one processor; and
at least one memory including computer program code,
the at least one memory and the computer program code configured to, with the at least one processor, cause the mobility management entity at least to:
determine a public land mobile network serving a user equipment over evolved-universal terrestrial radio access network has changed prior to a circuit switched fallback procedure for said user equipment,
issue a SGs location update request towards said mobile switching center/visitor location register over said SGs interface, based on determining said public land mobile network serving said user equipment over evolved-universal terrestrial radio access network has changed prior to said circuit switched fallback procedure for said user equipment,
wherein said SGs location update request comprises an indication of an identity of said public land mobile network serving said user equipment over evolved-universal terrestrial radio access network prior to said circuit switched fallback procedure.

2. The mobility management entity according to claim 1, wherein said circuit switched fallback is a procedure in which said user equipment is moved from evolved-universal terrestrial radio access network to GSM EDGE radio access network or universal terrestrial radio access network for access to circuit switched domain services.

3. The mobility management entity according to claim 2, wherein said indication facilitates a return of said user equipment, at completion of circuit switched domain services of said circuit switch fallback, to said public land mobile network that served said user equipment over evolved-universal terrestrial radio access network prior to said circuit switched fallback.

4. The mobility management entity according to claim 1, wherein said indication of said identity of said public land mobile network, serving said user equipment over evolved-universal terrestrial radio access network prior to said circuit switched fallback, is included in a tracking area identity of said SGs location update request.

5. The mobility management entity according to claim 1, wherein said indication of said identity of said public land mobile network, serving said user equipment over evolved-universal terrestrial radio access network prior to said circuit switched fallback, is included in an evolved-universal terrestrial radio access network cell global identifier of said SGs location update request.

6. A method, at a mobility management entity for supporting interworking with a mobile switching center/visitor location register via an SGs interface, said method comprising:
determining a public land mobile network serving a user equipment over evolved-universal terrestrial radio access network has changed prior to a circuit switched fallback procedure for said user equipment,
issuing a SGs location update request towards said mobile switching center/visitor location register over said SGs interface, based on determining said public land mobile network serving said user equipment over evolved-universal terrestrial radio access network has changed prior to said circuit switched fallback procedure for said user equipment, wherein said SGs location update request comprises an indication of an identity of said public land mobile network serving said user equipment over evolved-universal terrestrial radio access network prior to said circuit switched fallback procedure.

7. The method according to claim 6, wherein said circuit switched fallback is a procedure in which said user equipment is moved from evolved-universal terrestrial radio access network to GSM EDGE radio access network or universal terrestrial radio access network for access to circuit switched domain services.

8. The method according to claim 7, wherein said indication facilitates a return of said user equipment, at completion of circuit switched domain services of said circuit switch fallback, to said public land mobile network that served said user equipment over evolved-universal terrestrial radio access network prior to said circuit switched fallback.

9. The method according to claim 6, wherein said indication of said identity of said public land mobile network, serving said user equipment over evolved-universal terrestrial radio access network prior to said circuit switched fallback, is included in a tracking area identity of said SGs location update request.

10. The method according to claim 6, wherein said indication of said identity of said public land mobile network, serving said user equipment over evolved-universal terrestrial radio access network prior to said circuit switched fallback, is included in an evolved-universal terrestrial radio access network cell global identifier of said SGs location update request.

* * * * *